INVENTORS.
ROBERT B. ALBRIGHT
BERNARD WISE
BY
Brown, Denk & Synnestvedt
AGENTS

CABINET ANTENNA SYSTEM

Filed July 3, 1952 3 Sheets-Sheet 2

INVENTORS.
ROBERT B. ALBRIGHT
BERNARD WISE
BY
Brown, Denk & Synnestvedt
AGENTS

INVENTORS.
ROBERT B. ALBRIGHT
BERNARD WISE
BY
Brown, Denk & Synnestvedt
AGENTS

United States Patent Office 2,838,755

Patented June 10, 1958

2,838,755

CABINET ANTENNA SYSTEM

Robert B. Albright and Bernard Wise, Philadelphia, Pa., assignors to Philco Corporation, Philadelphia, Pa., a corporation of Pennsylvania Application July 3, 1952, Serial No. 297,076

13 Claims. (Cl. 343—876)

This invention relates to receiving antennas and more particularly to within-the-cabinet antennas for use in receivers operating in the V. H. F. bands.

The number of receivers operating in the V. H. F. band has increased rapidly in recent years. The major portion of this increase has been in the field of television receivers which, until recently, have operated exclusively in the V. H. F. band. The recent allocation of channels in the U. H. F. band to television transmitting stations will bring about a similar increase in the number of receivers operating in the U. H. F. band. In addition, it will result in the use of a large number of receivers that are designed to operate in either the V. H. F. or U. H. F. band.

In receivers operating in the V. H. F. and U. H. F. bands it is desirable to employ directional antennas in order to increase the signal strength at the input of the receiver and to eliminate spurious signals resulting from multipath propagation of the transmitted signal. If the receiver is to operate in a so-called "fringe area," i. e. an area at a substantial distance from the transmitter where the signal strength is relatively low, the impedance of the antenna should be approximately matched to the input impedance of the receiver in order that a maximum transfer of energy from the antenna to the receiver may be achieved. Antennas designed to be mounted on a roof, chimney or mast have been developed that will operate in both the U. H. F. and V. H. F. bands. However, such antennas are costly to construct, are difficult and costly to install and are looked upon with disfavor by architects, landlords, safety engineers and, in some instances, municipal governments. Therefore, it is also highly desirable from an economic and an aesthetic standpoint to have the antenna enclosed within the cabinet housing the receiver. This is entirely practical in television receivers having a relatively large screen size and a correspondingly large cabinet. In addition, it may be found desirable to incorporate a "within-the-cabinet" antenna on the underside of a table or stand designed to support a table model television set or in a piece of furniture that may be placed in the vicinity of a television set. Within-the-cabinet antennas may also be used in broadcast receivers of the frequency modulation type which also operate in the V. H. F. band. However, since the greater number of within-the-cabinet antennas will be employed in television receivers, the following description will be simplified by limiting the description to installations of this type.

If the antenna is to be housed within the cabinet, some provision must be made for adjusting the direction of maximum sensitivity of the antenna by electrical means since it will usually be unfeasible to orient the antenna by physical rotation of the cabinet, the orientation of the cabinet usually being dictated by the furniture arrangement of the user's home and other factors not related to the electrical characteristics of the antenna. The tuning and directivity adjustments of the antenna must be as simple as possible since these adjustments will be made by the television viewer. In addition to being tunable and adjustable as to directivity, the antenna should operate equally well in both the U. H. F. and V. H. F. bands since the current trend in receiver design is toward receivers that will receive all present and future television stations through the use of an U. H. F. converter included within the cabinet or associated with the receiver as an auxiliary unit. To be practical on a commercial scale, all of the desirable characteristics mentioned above must be achieved without greatly increasing the cost of manufacturing the receiver.

Many of the above requirements for the optimum antenna for a television receiver have been recognized for some time and various attempts have been made to provide an antenna meeting all of these requirements. All prior systems compromised on one or more important features. For example, variable directivity has been achieved in prior art antennas by switching among various antenna elements located within the cabinet. However, antennas of this type were not tunable and hence presented a serious mismatch on certain of the television channels. An impedance mismatch results in a loss of usable signal, a condition that cannot be tolerated in weak signal areas. Other prior art antennas were tunable by means of a variable capacitor or inductor connected between the elements of the antenna or in the transmission line connecting the antenna to the receiver. These antennas could not be oriented except by the physical movement of the television cabinet. One form of tunable array is disclosed in the copending application of Robert B. Albright, Serial No. 99,621 now Patent No. 2,642,528, issued June 16, 1953.

One form of a variable directivity, tunable array is shown in United States Patent No. 2,318,516, assigned to the assignee of the present invention. While the antenna disclosed in this patent is highly satisfactory from an engineering standpoint, it is not commercially acceptable for several reasons. First, the tuning and directivity controls are separate, and hence more complicated than will be tolerated by present day television viewers. Second, the space required to house the antenna, while not objectionable in the era of relatively small screen sizes, is greater than can be allotted to the antenna in present day television receivers. Finally, the cost of manufacturing an antenna of the type described in the aforementioned patent, when added to the cost of the remainder of the receiver, would immediately raise the price of the combination above that of all similar sets in the highly competitive field of home receivers.

Therefore it is an object of the present invention to provide an improved, directional, within-the-cabinet antenna which is both tunable and adjustable in directivity.

It is a further object of the invention to provide a within-the-cabinet antenna in which the tuning and directivity adjustments are combined in a single control.

Still another object of the invention is to provide a within-the-cabinet antenna in which the tuning and directivity adjustments are accomplished with a single multiposition switch.

A further object of the invention is to provide a tunable, within-the-cabinet antenna of adjustable directivity, which has a minimum number of parts and is inexpensive to manufacture.

The foregoing objects are generally accomplished by providing four easily fabricated foil or sheet metal antenna elements of novel design which are disposed adjacent to, and are supported by, the interior surface of the television cabinet to conserve space and to reduce the cost of manufacture The shape of these antenna elements is such that the input impedances of antenna arrays formed by interconnecting these four elements in a manner described in detail in a later portion of the specification are substantially equal to the input impedance of a conventional television receiver over all but the lowest frequencies in the V. H. F. band. The antenna elements are further shaped so that the reactance at one frequency in the V. H. F. band of an antenna array formed by connecting two of the antenna elements in a simple dipole array is capacitive and so related to the reactance at a different frequency in the V. H. F. band of an antenna array formed by connecting all four of the antenna elements in a biconical array that a single tuning inductor can be, and is employed to complete the matching of the antenna over the entire extent of the V. H. F. and U. H. F. frequency bands. A single, multiposition switch, which selectively connects the antenna elements into either a single dipole or a biconical antenna array and simultaneously connects the tuning inductor across the input terminals of the selected antenna array, completes the antenna system of the present invention. As will appear presently, this single switch provides all the tuning and directivity adjustments necessary for efficient reception of signals throughout the V. H. F. and U. H. F. bands.

In describing and claiming the present invention, the portions of the V. H. F. bands containing channels 2, 3 and 4, channels 5 and 6 and channels 7 through 13 will be considered as three separate frequency bands since the antenna system of the present invention exhibits different characteristics for each of these three bands.

For a better understanding of the invention together with other and further objects thereof, reference should be made to the following detailed description which is to be read in connection with the accompanying drawings in which.

Figure 1:
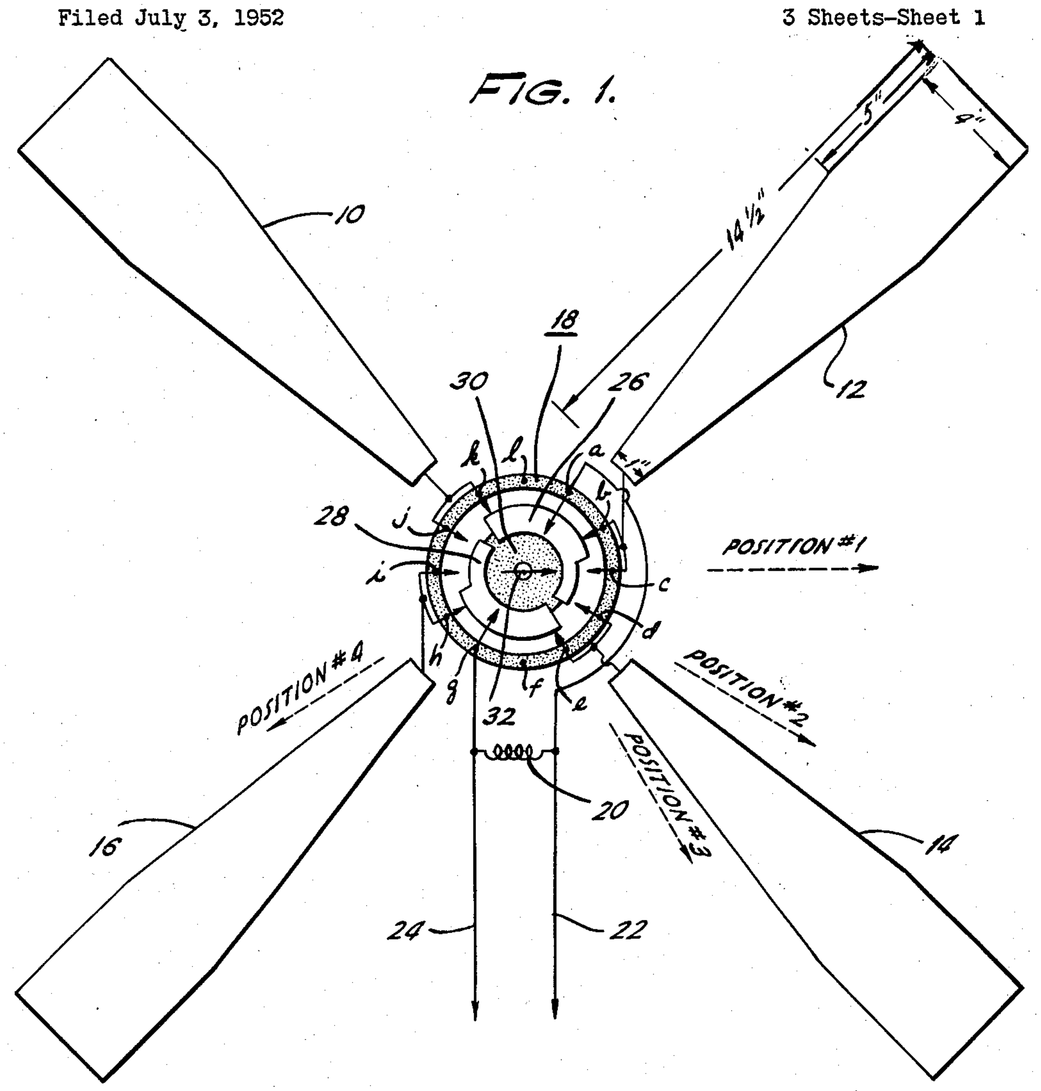
Fig. 1 is a schematic daigram of one preferred form of the present invention.
Figure 2:
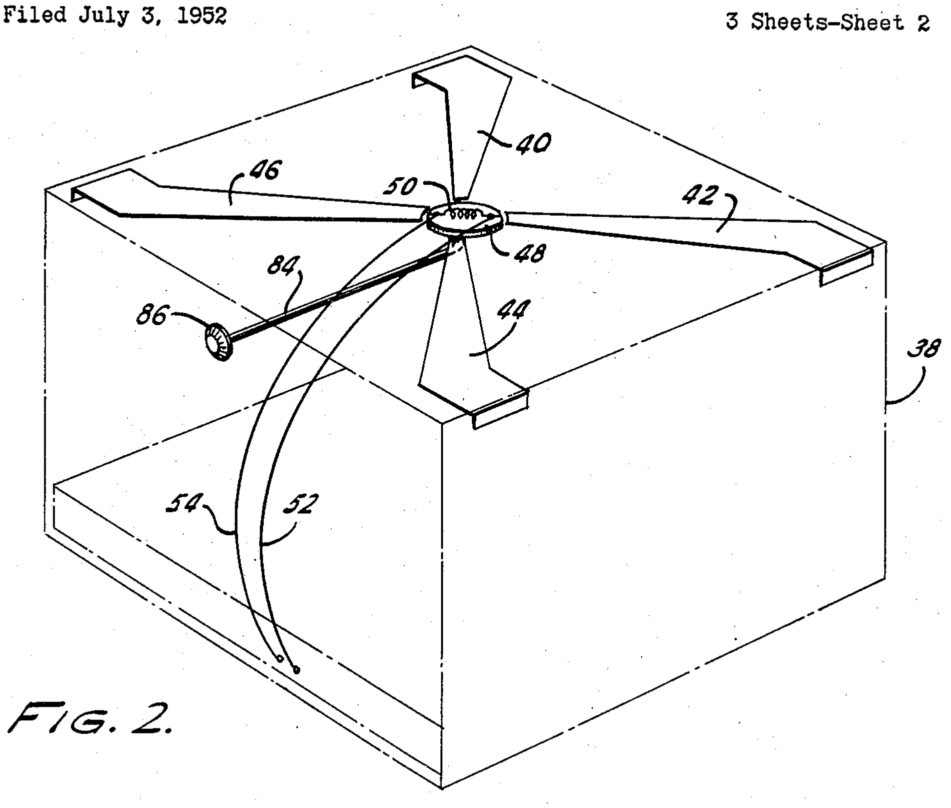
Fig. 2 is a pictorial view showing a second preferred form of the present invention installed within a cabinet.
Figure 7:
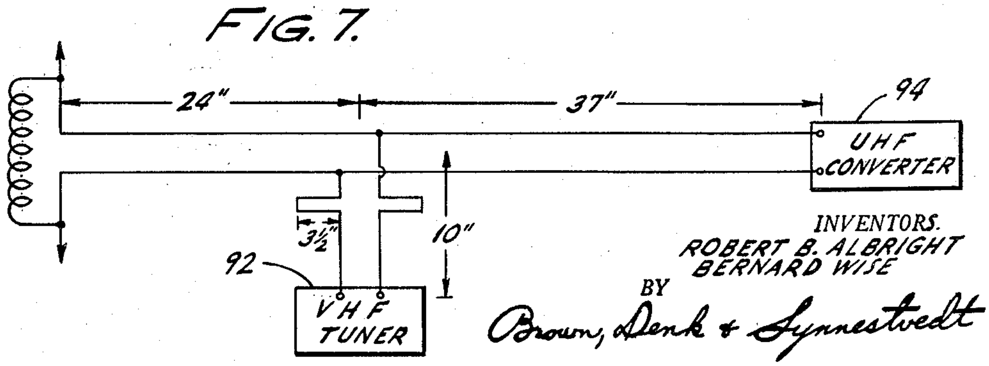

Fig. 7 is a schematic diagram showing the preferred manner of connecting the antenna system of Figs. 1 and 2 to an U. H. F. and a V. H. F. tuner.

Basic to the operation of the present invention are the four shaped antenna elements 10, 12, 14 and 16 shown in Fig. 1. These antenna elements are preferably constructed of thin sheet metal or metal foil of high conductivity, for example aluminum foil. For purely mechanical reasons, the aluminum foil may be laminated on a stiff paper backing if desired. The four antenna elements are preferably arranged radially in a horizontal plane at a point as far displaced from the chassis of the television receiver as possible. The horizontal placement of these elements is made necessary by the horizontal polarization of the television signal to be received. More specifically, these elements are preferably fastened by means of staples, cement or adhesive tape to the under surface of the top panel of the television cabinet and, in some instances, to portions of the side panels adjacent the top panel. The innermost ends of the elements 10, 12, 14 and 16 should lie closely adjacent one another near the center of the top panel. In Fig. 1 the spacing between the inner ends is exaggerated in order to show multiposition switch 18 in greater detail. The shape of antenna elements 10, 12, 14 and 16 determines, to a considerable extent, the impedance of the antenna as seen from the transmission line and the variation of this impedance with frequency. These elements may take many shapes within the limits of the present invention and for this reason the specification and drawings are not to be considered as showing the only possible shapes. However, the antenna elements shown in Figs. 1, 2 and 3 have been found to have a very desirable impedance versus frequency characteristic, and, for this reason, they have been dimensioned in detail in the drawings. In general, these antenna elements should be so shaped that the reactance presented at the input terminals is capacitive on channels 2, 3 and 4 with the four elements connected in a double V or "biconical" configuration and capacitive on channels 5 and 6 with two of the elements connected in the form of a simple dipole. In addition, the shape of these elements should be such that the capacitive reactances measured, respectively, at approximately the mid-frequency of channels 2, 3 and 4 and at the mid-frequency of channels 5 and 6 are substantially in the same ratio as the two above-mentioned frequencies. By so selecting the shape of the antenna elements, the antenna system may be tuned to resonance by a single inductor 20 connected between antenna lead-in wires 22 and 24 respectively. In addition, the antenna elements 10, 12, 14 and 16 should have a width that is an appreciable fraction of the length of each element, and should flare outwardly as shown in the drawing in order that the impedance of either the straight dipole or the double V configuration measured at the upper end of the V. H. F. band—namely, in the region containing television channels 7 through 13 and through the portion of the U. F. F. band assigned to television transmission—will be approximately equal to the input impedance of the receiver.

Full advantage of the desirable characteristics of the above-described shaped antenna elements is realized by selectively interconnecting these elements and the aforementioned inductor-transmission line combination in a novel way that permits a change in tuning and/or directivity to be accomplished by the simple turn of a switch. The novel interconnection of elements employed in this invention is most easily described by describing in detail switch 18. While the invention is not limited to the particular mechanical details of switch 18 about to be described, it may be of advantage to those practicing the invention to know that it has been found that the types of switches shown in Figs. 1 and 2 have been tested and found to be particularly well suited for use in antenna systems of the type described.

Referring once again to Fig. 1, multiposition switch 18, may be a wafer type switch having 12 contacts equally spaced around the circumference thereof. These contacts have been given the reference letters *a* through *l* in Fig. 1. Switch 18 also includes two 180° contact plates 26 and 28. Contact plates 26 and 28 have a relatively larger diameter portion extending over approximately 120° of the circumference of the plates and a reduced diameter portion extending over the remaining 60°. Two opposite contacts *a* and *g* are of sufficient length to contact the reduced diameter portion of contact plates 26 and 28. The remaining 10 contacts are only long enough to contact the larger diameter portion of plates 26 and 28. Contacts *l* and *f* on the switch receive no connections and therefore may be omitted if desired. Contact plates 26 and 28 are mounted on a suitable insulating support 30 which, in turn, is mounted on a shaft 32 having an axis of rotation perpendicular to the plane of the drawing. Shaft 32 is rotatable through at least 150°. Preferably switch 18 is provided with stops or detents located at 0°, 30°, 60° and 150° from the position of the reference arrow drawn through shaft 32 in Fig. 1. Shaft 32 may if desired be provided with a knob for controlling the position thereof. As shown in Fig. 1, shaft 32 would extend through the top panel of the cabinet housing the antenna. Switches of the type shown in Fig. 1 are well known in the art and are commercially available from various manufacturers.

The first of four novel arrays formed by selectively interconnecting the shaped antenna elements and the inductor-transmission line combination is produced by placing switch 18 in position 1 shown in Fig. 1. With switch 18 in the position shown in Fig. 1, antennas 10 and 12 are electrically joined at the center through contact plate 26. Antenna elements 14 and 16 are electrically joined through contact plate 28, and input leads 22 and 24 are connected to contact plates 26 and 28, respectively, through contacts *a* and *g*. Therefore the antenna system of Fig. 1 will have the configuration shown in Fig. 6A. This form of array is known as a biconical or double V array and has an axis of maximum directivity in the east-west direction, considering the top of Fig. 6 as the north direction. As stated above, this biconical array is tuned to approximate resonance for television channels 2, 3 and 4 by coil 20, which is joined to the input terminals of the array. A coil formed of 7½ turns of number 16 tinned copper wire and measuring ½″ in diameter and 1⅜″ long was found to be satisfactory in the antenna system shown in Fig. 1. It is to be understood that coil 20 will tune the array shown in Fig. 6A to resonance at only one frequency. However, it has been found that if the anetnna elements are made sufficiently wide and are appropriately tapered, the reactance of the biconical array changes slowly with an increase or decrease in frequency so that a standing wave ratio of less than 5 may be obtained over the range of channels 2, 3 and 4. A standing wave ratio of 5 or less is generally satisfactory even in weak signal areas.

Figure 6:
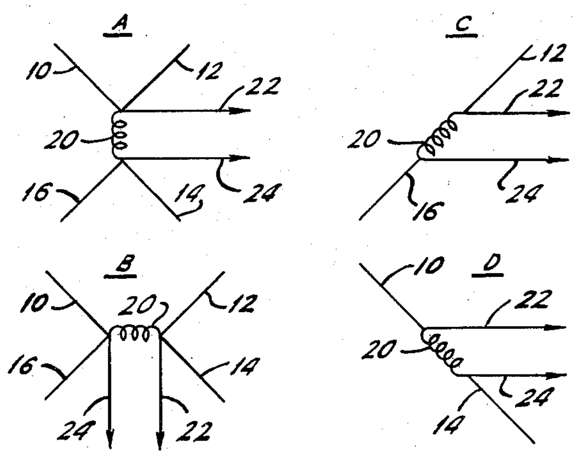
Figs. 6A through 6D are diagrammatic representations of the antenna configurations possible with the systems of Figs. 1 and 2.

If the switch 18 is advanced to position 3 as shown in Fig. 1, antenna elements 10, 12, 14 and 16 will be joined in the biconical array shown in Fig. 6B. The array of Fig. 6B has an axis of maximum directivity in the north-south direction again considering the top of Fig. 6 as north. At frequencies represented by television channels 2, 3 and 4, the beam patterns of the antenna arrays shown in Figs. 6A and 6B are sufficiently broad to receive signals in the northeast, southeast, northwest and southwest directions with switch 18 in either position 1 or position 3. Therefore the optimum directivity pattern obtainable with a matched array for any television station operating on channels 2, 3 and 4 may be selected by setting switch 18 in either position 1 or position 3.

If the switch 18 is placed in position 2, as shown in Fig. 1, the antenna elements of Fig. 1 will be connected in the array shown in Fig. 6C. In this array, elements 12 and 16 are connected to input leads 22 and 24, respectively, and coil 20 is again connected across the input terminals of the antenna. The simple dipole of Fig. 6C has an input capacitance somewhat lower than the biconical array of Fig. 6A and hence may be tuned to an approximate resonance by the same inductor 20. Again a standing wave ratio of not more than 5 is generally considered satisfactory for a within-the-cabinet antenna. The dipole array of Fig. 6C has a major axis of directivity in the northwest-southeast direction.

If switch 18 is advanced to position 4, a second dipole array as shown in Fig. 6D is formed. This dipole array, made up of elements 10 and 14, has a major axis of directivity in the northeast-southwest direction. At frequencies corresponding to television channels 5 and 6 the directivity patterns of the dipole arrays of Figs. 6C and 6D are sufficiently broad so that signals may be received in the north, south, east and west directions with switch 18 in either position 2 or position 4. Therefore the optimum directivity pattern obtainable with a matched array for any television station operating on channels 5 and 6 may be selected by setting switch 18 in either position 2 or position 4. As the foregoing description points out, the direction of the major axis of directivity of the antenna may be changed and the antenna tuned to approximate resonance for any one of channels 2, 3, 4, 5 and 6 by the manipulation of four-position switch 18.

If the television receiver is to be operated in a region of relatively high signal strength, matching the antenna to the receiver is less important. Therefore, in such strong signal areas, switch 18 may be placed in any of the four positions for any one of channels between 2 and 6. This permits a change in the direction of the major axis of directivity in 45° steps. A change of this magnitude is often desirable in eliminating spurious signals caused by multipath transmission of the television signal in strong signal areas. These spurious signals cause multiple images or "ghosts" on the viewing screen.

It has been found that if the shape of the antenna elements is selected so that the resistive component R of the shunt equivalent circuit of each of the arrays described above is made equal to 300 ohms at the mid-frequency points mentioned above and if the antenna elements are made sufficiently broad so that the reactive component X of the shunt equivalent circuit changes slowly with frequency then the four arrays shown in Figs. 6A to 6D will have an input impedance very nearly equal to 300 ohms, the standard input impedance for television receivers, for channels 7 through 13 of the V. H. F. band and throughout the U. H. F. band assigned to television broadcasting. This results from the fact that the input impedance of the four arrays without the inductor are very nearly equal to 300 ohms throughout the bands mentioned, and the impedance of the inductor is very high in these bands so that the shunting effect of the inductor may be disregarded. Therefore, it will be possible to select the antenna configuration to give the desired directivity without regard to the tuning condition when receiving at these higher frequencies.

It should be understood that the television viewer need not be aware of the electrical theory explained above in order to achieve optimum operation of the antenna. In all probability the viewer will select the proper position of the switch for the particular channel to which he is tuned by the process of trial and error. Very little time will be required to establish the proper position since switch 18 has only four possible positions.

In the antenna shown in Fig. 1, elements 10, 12, 14 and 16 are illustrated as lying entirely within a horizontal plane. However, it may be desirable in certain instances additionally to extend each of these elements in planes perpendicular to the horizontal plane for a distance of 1″ to 3″ in order to increase the capacitance presented by the antenna elements at their innermost ends. Extending the antenna elements in this manner does not materially alter the effective electrical length of these elements but it does produce a substantial change in the capacitance of each individual element.

Fig. 2 shows an antenna system similar to that described above disposed within a receiver cabinet schematically illustrated by the dashed line 38. In the array shown in Fig. 2, antenna elements 40, 42, 44 and 46 are fastened to the underside of the top panel of cabinet 38. The outermost ends of these four antenna elements are folded 90° and secured to the side panels of the receiver for the reason explained above. This fold need not be a sharp 90° fold but may conform to any filet or reinforcing member present in the corner of the television cabinet. The antenna elements 40, 42, 44 and 46 are so shaped that they meet the side panels of the cabinet substantially at right angles. A switch 48 and coil 50 are diagrammatically shown in Fig. 2, more detailed views of these elements being found in Figs. 4 and 5. The input terminals of the receiver are shown connected to the antenna system through conductors 52 and 54 of a parallel wire transmission line.

Figure 3:
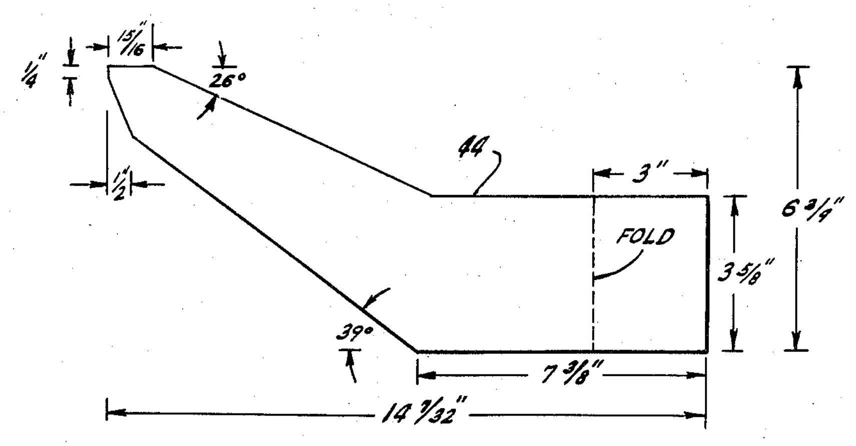
Fig. 3 is a plan view of one of the antenna elements of the antenna system of Fig. 2.

A preferred shape of the antenna elements of Fig. 2 is shown in Fig. 3. As stated above, the shapes of the antenna elements shown in Figs. 1 and 3 are presently preferred but they do not constitute the only shapes the antenna elements of the present invention may take. The exact shape of the antenna elements will depend to a certain extent on the size of the cabinet housing the antenna and the reactance to be obtained at the input terminals. However, the dimensions given in Fig. 3 will serve as a guide in constructing antenna elements of a different size.

Figure 4:
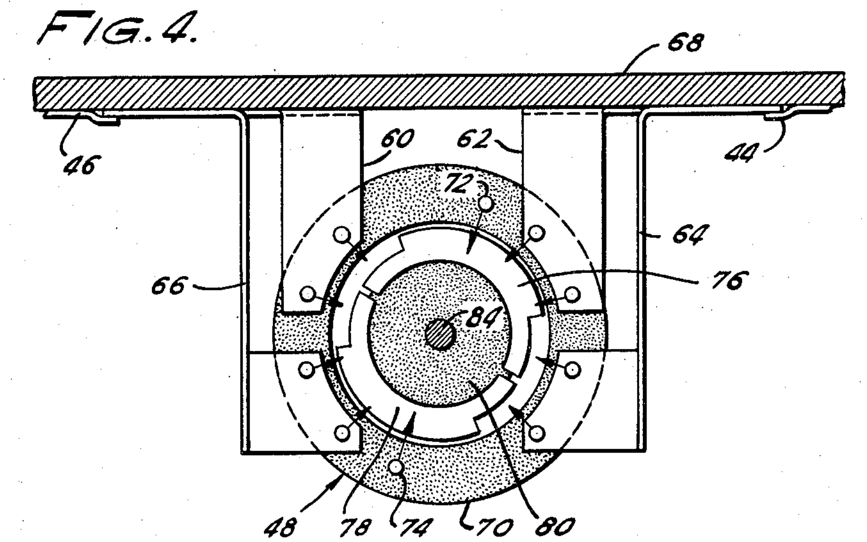
Fig. 4 is a detailed view of the central portion of the antenna system of Fig. 2.
Figure 5:
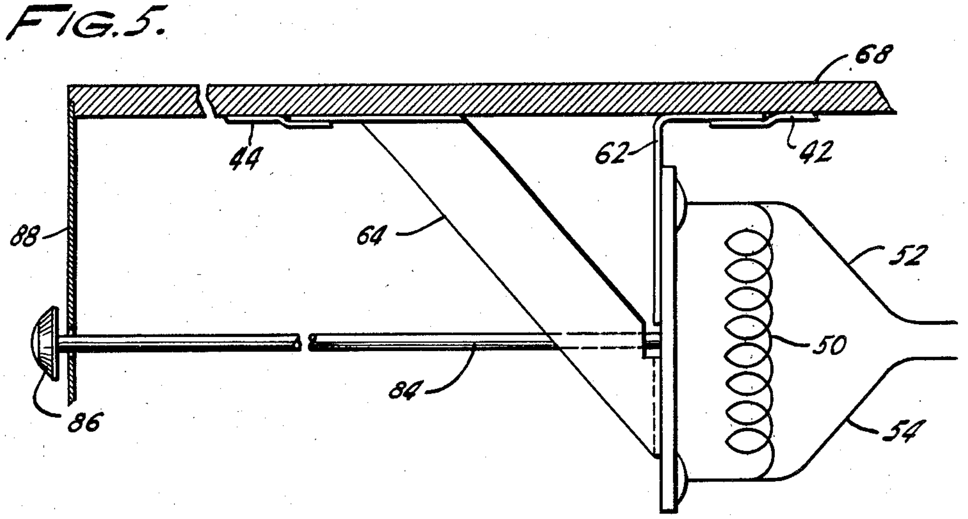
Fig. 5 is a second detailed view of the central portion of the antenna system of Fig. 2 taken at right angles to the view of Fig. 4.

Figs. 4 and 5 are detailed views of the switch 48 of Fig. 2 together with supporting means therefor. Supporting brackets 60, 62, 64 and 66 are fastened to the under surface of the top of the television cabinet shown at 68. The innermost ends of antenna elements 40, 42, 44 and 46 overlie and make electrical contact with the horizontal portions of supporting brackets 60, 62, 64 and 66, respectively. The depending ends of the supporting brackets are mechanically secured to the outer ring 70 of switch 48 and are electrically connected to selected pairs of contacts disposed around ring 70. Therefore brackets 60, 62, 64 and 66 serve the dual function of mechanically supporting switch 48 and of electrically connecting the four antenna elements to the switch contacts. The conductors 52 and 54 of the transmission line from the receiver input terminals are connected to contacts 72 and 74 of switch 48. Switch 48 also includes two contact plates 76 and 78 supported on an insulating rotor 80. Plates 76 and 78 differ somewhat in shape from the contact plates 26 and 28 of Fig. 1 but the antenna configurations provided by four separate, selectable positions of the switch 48 are identical to those shown in Figs. 6A through 6D. The tuning inductor 50 shown in Figs. 2 and 5 is also connected between terminals 72 and 74. In the antenna system shown in Fig. 2, coil 50 is preferably formed of eight turns of number 16 tinned copper wire, the coil having an inside diameter of ½" and an overall length of 1¼". The distance from the axis of the coil to switch 48 is approximately ¾". In the switch arrangement shown in Figs. 4 and 5, switch 48 is mounted in a vertical plane and an operating rod 84 extends from the switch to a knob 86 located outside the rear panel 88 of the television cabinet. The position of switch 50 is governed purely by considerations of mechanical design. This switch may be so oriented that the control shaft extends through the front panel of the cabinet or through either side panel of the cabinet. The switch may alternatively be oriented so that the control rod extends through the top panel of the cabinet and means other than control rod 84 and knob 86 may be employed to control the position of the switch 48. However, the present trend in television cabinet design is to pltce as few controls as possible on the front panel and place all remaining controls on the rear panel of the cabinet.

Fig. 7 illustrates the preferred method of connecting the antenna arrays of Figs. 1 and 2, schematically illustrated by the coil and switch controls 90, to a V. H. F. tuner 92 and a U. H. F. converter 94. All of the transmission lines shown in Fig. 7 are conventional 300-ohm, twin-lead transmission lines. The U. H. F. converter 94 presents a substantially infinite impedance at the junction of the transmission line leading to the V. H. F. tuner 92 for all signals in the V. H. F. band. Similarly, the V. H. F. tuner 92 and the 3½" series matching stubs shown in Fig. 7 present a substantially infinite impedance to all signals in the U. H. F. band. However, in making the connection shown in Fig. 7, a low capacitance terminal strip should be used at the point of connection of the three transmission lines. A standard antenna terminal strip employed in currently manufactured television receivers may present a substantial mismatch to the system if connected at this point. In a laboratory test of the system shown in Fig. 7, a standing wave ratio less than 3.0 was obtained at all points in the U. H. F. band with normal V. H. F. operation. If the receiver to be used with the present invention includes a single tuner that covers both the V. H. F. and the U. H. F. bands, the problem of connecting together a V. H. F. tuner and a U. H. F. converter does not arise and a single section of non-resonant line may be connected between the antenna and the single tuner.

While the present invention has been described as a within-the-cabinet antenna, it should be obvious that the cabinet provides no other function than to lend mechanical support to the various parts of the antenna system. Therefore, the antenna system of the present invention may be operated without the cabinet by making the various parts of the system of sufficient strength to be self-supporting.

Economy of space and ease of manufacture have not been stressed in the foregoing description since these features naturally follow from the novel but straightforward arrangement and configuration of elements in the two embodiments of the invention disclosed herein.

The invention embraces the changes and modifications of the preferred embodiments described in detail above and such other changes and modifications as are suggested to those skilled in the art by the foregoing description. Therefore, for a determination of the limits of the present invention, reference should be made to the hereinafter appended claims which are to be interpreted in the light of the foregoing description.

What is claimed is:

1. An antenna system comprising four shaped antenna elements, extending radially in a common plane from a common point, a fixed tuning element, and a switch disposed adjacent to the centrally disposed ends of said antenna elements, said switch being electrically connected to said centrally disposed ends of each of said antenna elements and to said tuning element, said switch being constructed and arranged to selectively connect said four antenna elements into any one of a plurality of differently oriented arrays, at least one of said arrays being a dipole array and at least one of said arrays being a biconical array, and to connect said tuning element across the input terminals of each of said plurality of arrays.

2. An antenna system comprising four shaped antenna elements extending radially in a common plane from a common point, a tuning inductor, and a fixed multiterminal, multiposition switch disposed adjacent the centrally disposed ends of said antenna elements, said switch being electrically connected to said inductor and to the adjacent ends of said four antenna elements, said switch being constructed and arranged to selectively connect said four antenna elements into any one of four differently oriented arrays, said four arrays including two dipole arrays and two biconical arrays, said switch being constructed and arranged to connect said inductor across the input terminals of each of said arrays.

3. An anetnna system comprising four antenna elements extending radially from a common point, at least the major portions of said four antenna elements lying substantially in a common plane, a two-conductor transmission line, a fixed tuning inductor connected between said two conductors of said transmission line at a first end thereof, a multiposition, multiterminal switch disposed adjacent to said common point, each of said antenna elements being connected to at least one terminal of said switch, the ends of the two conductors of said transmission line at said first end thereof being connected to separate terminals on said switch, said switch being constructed and arranged to selectively connect said four antenna elements into any one of four differently oriented arrays, said four arrays including two dipole arrays and two biconical arrays, and to connect said first end of said transmission line to the input terminals of each of said arrays.

4. In combination with a non-metallic cabinet for housing a carrier wave receiver, an antenna system adapted to receive carrier waves over a wide frequency range, said antenna system comprising four antenna elements disposed adjacent to the under surface of the top panel of said cabinet, said antenna elements extending substantially radially from a point adjacent the center of said top panel, each of said antenna elements being formed of a sheet of conductive material, each of said antenna elements tapering from a width equal to a small fraction of its length at the end adjacent said center point to a width equal to a substantial fraction of its length at the end opposite said center point, a two-conductor transmission line, a fixed inductor connected between said two conductors at a first end of said transmission line, a multiterminal, multiposition switch disposed adjacent to the centrally disposed ends of said antenna elements, said switch being electrically connected to the centrally disposed ends of each of said antenna elements and to said two conductors at said first end of said transmission line, said switch being constructed and arranged to selectively connect said four antenna elements into any one of a plurality of differently oriented arrays, two of said arrays being mutually perpendicular, biconical arrays and two of said arrays being single dipole arrays, and means accessible from without said cabinet for selectively setting said switch in any one of said multiple positions.

5. In combination with a non-metallic cabinet for housing a carrier wave receiver, said cabinet including at least a top panel and first and second oppositely disposed side panels, an antenna system adapted to receive carrier waves over a wide frequency range, said antenna system comprising four antenna elements formed of sheet conductive material, the major portion of each of said antenna elements extending substantially radially from a point adjacent the center of said top panel in positions adjacent to the under surface of the top panel of said cabinet, the ends of said antenna elements opposite said centrally disposed ends extending parallel to said side panels, each of said antenna elements tapering from a width equal to a small fraction of its length at the end adjacent said center point to a width equal to a substantial fraction of its length at the end opposite said center point, a two-conductor transmission line, a fixed inductor connected between said two conductors at a first end of said transmission line, a multiterminal, multiposition switch disposed adjacent to said point adjacent the center of said top panel, said switch being electrically connected to the centrally disposed ends of each of said antenna elements and to said two conductors at said first end of said transmission line, said switch being constructed and arranged to selectively connect said four antenna elements into any one of a plurality of differently oriented arrays, two of said arrays being mutually perpendicular, biconical arrays and two of said arrays being single dipole arrays, and means accessible from without said cabinet for selectively setting said switch in any one of said multiple positions.

6. In combination with a non-metallic cabinet for housing a carrier wave receiver, said cabinet including at least a top panel and first and second oppositely disposed side panels, an antenna system adapted to receive carrier waves over a wide frequency range, said antenna system comprising four similar antenna elements formed of sheet conductive material, the major portion of each of said antenna elements extending adjacent to the under surface of said top panel of said cabinet, said major portion consisting of a first tapered portion extending from a point near the center of said top panel in the general direction of one vertical corner of said cabinet and a second, substantially straight portion forming a continuation of said tapered portion and extending substantially at right angles to the line of intersection of said top panel and one of said side panels, each of said antenna elements including a third portion forming a continuation of said second portion and extending parallel to one of said side panels, each of said antenna elements tapering from a width equal to a small fraction of its length at the end adjacent said center point to a width equal to a substantially larger fraction of its length at the end opposite said center point, a two-conductor transmission line, a fixed inductor connected between said two conductors at a first end of said transmission line, a multiterminal, multiposition switch electrically connected to the centrally disposed end of each of said antenna elements and to said two conductors at said first end of said transmission line, said switch being constructed and arranged to selectively connect said four antenna elements into any one of a plurality of differently oriented arrays, two of said arrays being mutually perpendicular, biconical arrays and two of said arrays being mutually perpendicular, single dipole arrays, and means accessible from without said cabinet for selectively setting said switch in any one of said multiple positions.

7. An antenna system adapted to receive carrier waves having frequencies lying within the very high frequency and ultrahigh frequency bands assigned to commercial television broadcasting, said antenna system comprising four antenna elements extending substantially radially from a common point, at least the major portion of each of said antenna elements lying substantially in a common plane, a fixed inductor, and a multiterminal, multiposition switch electrically connected to each of the two end terminals of said inductor and to the centrally disposed ends of said four antenna elements, said switch being constructed and arranged to connect said four antenna elements selectively into any one of four differently oriented arrays, two of said arrays being biconical arrays and two of said arrays being dipole arrays, the resistive component of input impedance of said biconical arrays and said dipole arrays being substantially equal to 300 ohms throughout said two frequency bands, the reactive component of impedance of said biconical arrays at the mid-frequency of the television channels 2, 3 and 4 being substantially equal to the inductive reactance of said fixed inductor at said mid-frequency, the reactive component of impedance of said dipole arrays at the mid-frequency of television channels 5 and 6 being substantially equal to the inductive reactance of said fixed inductor at said last-mentioned mid-frequency, the reactive component of each form of array having a negligible value at frequencies corresponding to television channels 7 through 13 and the ultrahigh frequency band assigned to television broadcasting, said inductor having an impedance large compared to 300 ohms at frequencies corresponding to television channels 7 through 13 and the ultrahigh frequency band assigned to television broadcasting, said switch being arranged to connect said inductor across the terminals of each of said arrays.

8. An antenna system adapted to receive carrier waves in at least two different frequency bands, said antenna system comprising four conductive antenna elements extending substantially radially from a common point, at least the major portions of said antenna elements lying substantially in a common plane, the radial directions in said plane taken by adjacent elements being substantially mutually perpendicular, a fixed inductor, and a multiterminal, multiposition switch disposed adjacent said common point, said switch being electrically connected to each of the two end terminals of said inductor and to the centrally disposed ends of said four antenna elements, said switch being constructed and arranged to interconnect selectively said four antenna elements to form selectively any one of a plurality of differently oriented arrays, at least one of said arrays being a biconical array and at least one of said arrays being a dipole array, said dipole array having a reactive component of input impedance measured at the centrally disposed terminals of said array which is substantially equal but opposite in sign to the reactance of said fixed inductor at one of said frequency bands and said biconical array having a reactive component of input impedance measured at the centrally disposed terminals of said array which is substantially equal but opposite in sign to the reactance of said inductor at a second one of said frequency bands, said switch being arranged to connect said inductor across the centrally disposed terminals of each of said arrays formed by said switch.

9. An antenna system adapted to receive carrier waves in at least two different frequency bands, said antenna system comprising four antenna elements extending substantially radially from a common point, at least the major portions of each of said four antenna elements being disposed in a common plane, the radial direction in said plane taken by adjacent elements being substantially mutually perpendicular, each of said antenna elements being formed of sheet conductive material, each of said antenna elements being relatively narrow at the end adjacent said common point and tapering outwardly to a width equal to a substantial fraction of the length at a point adjacent the opposite end of said antenna element, a two conductor transmission line, a fixed inductor connected between said two conductors at a first end of said transmission line, and a multiterminal, multiposition switch disposed adjacent to said common point, said switch being electrically connected to each of said antenna elements and to said two conductors at said first end of said transmission line, said switch being constructed and arranged to interconnect selectively said four antenna elements to form selectively any one of a plurality of differently oriented arrays, two of said arrays being mutually perpendicular, biconical arrays and two of said arrays being mutually perpendicular, single dipole arrays, said dipole arrays having a reactive component of input impedance measured at the centrally disposed ends of the antenna elements forming said dipole arrays which is substantially equal to but opposite in sign to the reactance of said fixed inductor at one of said frequency bands, said biconical arrays having a reactive component of input impedance measured at the centrally disposed ends of said antenna elements forming said biconical arrays which is substantially equal to but opposite in sign to the reactance of said inductor at a second one of said frequency bands, said first end of said transmission line being connected by said switch across the centrally disposed terminals of each of the arrays formed by said switch.

10. An antenna system adapted to receive carrier waves in at least two different frequency bands, said antenna system comprising four antenna elements extending substantially radially from a common point, the major portions of each of said four antenna elements being disposed substantially in a common plane, the radial directions in said plane taken by adjacent elements being substantially mutually perpendicular, each of said antenna elements being formed of sheet conductive material, each of said antenna elements being relatively narrow at the end adjacent said common point and tapering outwardly to a width equal to a substantial fraction of the length at a point adjacent the opposite end of said antenna element, a two conductor transmission line, a fixed inductor connected between said two conductors at a first end of said transmission line, and a multiterminal, multiposition switch disposed adjacent said common point, said switch being electrically connected to the centrally disposed ends of each of said antenna elements and to said two conductors at said first end of said transmission line, said switch being constructed and arranged to interconnect selectively said four antenna elements to form selectively any one of a plurality of differently oriented arrays, two of said arrays being mutually perpendicular, biconical arrays and two of said arrays being mutually perpendicular, single dipole arrays, the imaginary component of the shunt equivalent circuit of said dipole arrays being substantially equal to but opposite in sign to the reactance of said fixed inductor at the mid-frequency of one of said frequency bands and the imaginary component of the shunt equivalent circuit of said biconical arrays being substantially equal but opposite in sign to the reactance of said inductor at the mid-frequency of a second one of said frequency bands, the real component of said shunt equivalent circuit for either of said arrays being substantially equal to three hundred ohms, said first end of said transmission line being connected by said switch across the centrally disposed terminals of each of said arrays formed by said switch.

11. An antenna system adapted to receive carrier waves in at least two different frequency bands, said antenna system comprising four antenna elements extending radially from a common point, at least the major portion of each of said four antenna elements lying substantially in a common plane, the radial direction in said plane taken by adjacent elements being substantially mutually perpendicular, each of said antenna elements being formed of sheet conductive material, each of said antenna elements having a length equal to approximately $\frac{1}{10}$ of a wavelength at the lowest frequency to be received, each of said antenna elements tapering from a width equal to approximately $\frac{1}{40}$ the length at the end adjacent said common point to a width of approximately $\frac{1}{4}$ to $\frac{1}{3}$ the length at a point adjacent the opposite end of said antenna element, a two conductor transmission line, a fixed inductor connected between said two conductors to a first end of said transmission line, and a multiterminal, multiposition switch disposed adjacent said common point, said switch being electrically connected to the centrally disposed ends of each of said antenna elements and to said two conductors at said first end of said transmission line, said switch being constructed and arranged to interconnect selectively said four antenna elements to form selectively any one of a plurality of differently oriented arrays, two of said arrays being mutually perpendicular, biconical arrays and two of said arrays being mutually perpendicular, single dipole arrays, said dipole arrays having a reactive component of input impedance measured at the centrally disposed ends of said antenna elements forming said array which is substantially equal but opposite in sign to the reactance of said fixed inductor at one of said frequency bands and said biconical arrays having a reactive component of input impedance measured at the centrally disposed ends of the elements forming said array which is substantially equal but opposite in sign to the reactance of said inductor at a second one of said frequency bands, said first end of said transmission line being connected by said switch across the input terminals of each of said arrays formed by said switch.

12. An antenna system adapted to receive carrier waves having frequencies lying within the very high frequency and ultrahigh frequency bands assigned to commercial television broadcasting, said antenna system comprising four antenna elements extending substantially radially from a common point, at least the major portion of each of said antenna elements lying substantially in a common plane, the radial directions in said plane taken by adjacent elements being substantially mutually perpendicular, a fixed inductor, and a multiterminal, multiposition switch disposed adjacent to said common point, said switch being electrically connected to each of the two end terminals of said inductor and to the centrally disposed ends of said four antenna elements, said switch being constructed and arranged to interconnect selectively said four antenna elements to form selectively any one of a plurality of differently oriented arrays, at least one of said arrays being a biconical array and at least one of said arrays being a dipole array, each of said arrays having a pair of central terminals at said switch means, said dipole array and said biconical array having substantially the same resistive component of input impedance measured at said central terminals of said arrays, said resistive component of input impedance of the several arrays being substantially constant throughout said ultrahigh and very high frequency bands, said biconical array having a reactive component of input impedance at the mid-frequency of television channels 2, 3 and 4 which is substantially equal to the inductive reactance of said fixed inductor at said mid-frequency, said dipole array having a reactive component of input impedance at the mid-frequency of television channels 5 and 6 which is substantially equal to the inductive reactance of said fixed inductor at said last-mentioned mid-frequency, said dipole array and said biconical array having a negligible value of reactive component of input impedance at frequencies corresponding to television channels 7 and 13 and the ultrahigh frequency band assigned to television broadcasting, said switch being arranged to connect said inductor across the central terminals of each of the arrays formed by said switch.

13. An antenna system adapted to receive carrier waves in at least two different frequency bands, said antenna system comprising four antenna elements extending substantially radially from a common point, the major portions of said four antenna elements being disposed in a common plane, the radial directions in said plane taken by adjacent elements being substantially mutually perpendicular, each of said antenna elements being formed of sheet conductive material, each of said antenna elements having an unfolded shape comprising a substantially rectangular portion having a longer dimension approximately twice the shorter dimension and a tapering portion extending from one shorter side of the rectangular portion, the two major sides of said tapering portion extending from points adjacent two adjacent corners of said rectangular portion, said two major sides converging in an angle of approximately 13°, the apex of said tapering portion being truncated such that said entire unfolded antenna element is contained within a second rectangle having one corner, one shorter side, and one longer side overlying one corner, one shorter side, and one longer side, respectively, of said rectangular portion, said second rectangle having shorter and longer dimensions approximately twice the shorter and longer dimensions, respectively, of said rectangular portion, each of said antenna elements being the mirror image of the two antenna elements immediately adjacent thereto, the end of said rectangular portion remote from said tapered portion of each antenna element being folded along a line parallel to a shorter side of said rectangular portion to a position substantially perpendicular to said common plane, said folded portion of each antenna element having an area less than half the area of said rectangular portion of said antenna element, each of said antenna elements being disposed with said truncated apex adjacent said common point, a two conductor transmission line, a fixed inductor connected between said two conductors at a first end of said transmission line, a multiterminal, multiposition switch disposed adjacent said common point, said switch being electrically connected to the centrally disposed ends of each of said antenna elements and to said two conductors at said first end of said transmission line, said switch being constructed and arranged to interconnect selectively said four antenna elements to form selectively any one of a plurality of differently oriented arrays, two of said arrays being mutually perpendicular, biconical arrays and two of said arrays being mutually perpendicular single dipole arrays, and means for setting said switch selectively in any one of said multiple positions.

References Cited in the file of this patent

UNITED STATES PATENTS

| | | |
|---|---|---|
| 1,827,054 | Arco | Oct. 13, 1931 |
| 1,934,412 | Englund | Nov. 7, 1933 |
| 2,293,112 | Carlson et al. | Aug. 18, 1942 |
| 2,430,353 | Masters | Nov. 4, 1947 |
| 2,512,704 | Willoughby | June 27, 1950 |
| 2,552,816 | Root | May 15, 1951 |
| 2,585,670 | Middlemark | Feb. 12, 1952 |
| 2,609,503 | Middlemark | Sept. 2, 1952 |
| 2,642,528 | Albright | June 16, 1953 |
| 2,664,507 | Mural | Dec. 29, 1953 |

OTHER REFERENCES

Lentz: "A Combination DX Directional Receiving Aerial," Radio Craft, page 276, November 1939.

UNITED STATES PATENT OFFICE

CERTIFICATE OF CORRECTION

Patent No. 2,838,755 June 10, 1958

Robert B. Albright et al.

It is hereby certified that error appears in the printed specification of the above numbered patent requiring correction and that the said Letters Patent should read as corrected below.

Column 1, line 17, for "V.H.F. bands" read -- V.H.F. and U.H.F. bands--; column 3, line 50, after "U.H.F." insert -- converter --; column 7, line 46, for "pltce" read -- place --; column 8, line 38, for "a tuning" read -- a fixed tuning --; same line, after "and a" strike out "fixed"; line 49, for "anetnna" read -- antenna --.

Signed and sealed this 2nd day of December 1958.

(SEAL)
Attest:

KARL H. AXLINE
Attesting Officer

ROBERT C. WATSON
Commissioner of Patents